United States Patent [19]
Miyamoto

[11] Patent Number: 5,127,561
[45] Date of Patent: Jul. 7, 1992

[54] STORAGE BOX WITH LOCKABLE LID FOR A MOTORCYCLE

[75] Inventor: Toshio Miyamoto, Hamamatsu, Japan

[73] Assignee: Suzuki Kabushiki Kaisha, Japan

[21] Appl. No.: 643,724

[22] Filed: Jan. 18, 1991

[30] Foreign Application Priority Data

Jan. 29, 1990 [JP] Japan .................................. 2-16197

[51] Int. Cl.⁵ ........................... B62J 7/00; B60R 7/00
[52] U.S. Cl. .............................. 224/32 R; 224/42.42; 296/37.1; 280/769
[58] Field of Search ............... 224/32 R, 42.42, 0.5, 224/30 R, 33 R, 33 A, 91, 92.11; 280/769, 288.4; 296/371; 180/89.11, 89.17

[56] References Cited

U.S. PATENT DOCUMENTS 4,802,682  2/1989  Yasuji .............................. 224/32 R

FOREIGN PATENT DOCUMENTS 77377  3/1990  Japan .............................. 224/32 R Primary Examiner—Renee S. Luebke
Assistant Examiner—David J. Walczak
Attorney, Agent, or Firm—Bruce L. Adams; Van C. Wilks

[57] ABSTRACT

A motorcycle is equipped with a storage box disposed at a substantially upper central portion of a body frame for accommodating a helmet. The storage box comprises a storage box body having an upper opening and made of two box halves which are composed of synthetic resin. The storage box body is attached to the body frame at one end to be upwardly swingable and is secured at the other end to the body frame through an attachment bracket. A lid member is pivotally secured to the storage box body to be upwardly swingable to open or close the opening of the storage box body. The storage box body is hinged by a first hinge mechanism disposed at an outer surface of the storage box body, and the lid member is hinged by a second hinge mechanism disposed at an inner surface of the storage box to be upwardly swingable to open or close the storage box body. The lid member is locked by a lock mechanism disposed at an inner surface of the storage box body. The first and second hinge mechanisms, the lock mechanism and the attachment bracket are arranged to span the two box halves to firmly join the same with improved rigidity.

12 Claims, 8 Drawing Sheets

STORAGE BOX WITH LOCKABLE LID FOR A MOTORCYCLE

BACKGROUND OF THE INVENTION

This invention relates to a storage box apparatus for a motorcycle and positioned at the upper central portion of a body of the motorcycle.

There has been provided a motorcycle provided with a large storage box capable of accommodating a "full-face" helmet at the upper central portion of the motorcycle body.

It is required that such a storage box function as a knee-grip and be comparatively robust. On the other hand, it is also required that the storage box be light in weight and, therefore, in most cases, the storage box is made of synthetic resin material.

Since, however, the appearance of the storage box is also important, it is designed with a substantially stream-surfaced shape including an opening/closing lid, and moreover because of its large size, problems of productivity and costs occur in performing a precise monolithic molding.

Although improvements may be made with respect to these points if the storage box is molded in parts and then welded together, there have been problems that, when trying to achieve a strong unification, a wide bead line of welding remains which mars the appearance and requires considerable processing and labor to remedy.

SUMMARY OF THE INVENTION

An object of the present invention is to substantially eliminate or overcome the improve defects or drawbacks encountered in the prior art and to provide a storage box apparatus of a motorcycle comprising a storage box body composed of laterally divided two halves which are easily moldable so as to have a relatively streamlined outer appearance.

Another object of the present invention is to provide a storage box apparatus of a motorcycle including improved hinge and lock mechanism for the storage box body and a lid member therefor for attaining firm and safe open-close operation of the storage box body and the lid member as well as attaining improved rigidity of the storage box apparatus.

These and other objects can be achieved according to the present invention by providing a storage box apparatus of a motorcycle disposed at a substantially upper central portion of a body frame of the motorcycle, comprising a storage box body having an upper opening and constituted by bilaterally divided two box halves which are joined with each other to form the storage box body, the storage box body being attached to the body frame at one end to be upwardly swingable and secured at another end to the body frame through an attachment bracket, a lid member secured to the storage box body to be upwardly swingable to open or close the opening of the storage box body, a first hinge means disposed at an outer surface of the storage box body for supporting the storage box body to be upwardly swingable, a second hinge means disposed at an inner surface of the storage box body for supporting the lid member to be upwardly swingable to open or close the storage box body, and a lock means disposed at an inner surface of the storage box body for locking the lid member, the first and the second hinge means, the lock means and the attachment bracket being arranged to span the two box halves.

In a preferred embodiment, the two body halves are made of synthetic resin material and are welded or bonded into a unitary storage box body.

The storage box body is provided with a bottom plate, and the first hinge means is disposed at the rear end portion of the storage box body and includes a bearing bracket through which the first hinge means is swingably secured to the bottom plate. The second hinge means is disposed at the front end portion of the storage box body and includes a bearing means through which the second hinge means is swingably secured to the bottom plate. The lock means is attached to the rear end portion of the storage box body on the outside of the lid member and includes a striker, an engaging lever operatively connected to the striker and a solenoid means operatively connected to the engaging lever. The storage box body has a front portion recessed inwardly to form a space between the storage box body and the body frame.

According to the structure of the storage box apparatus of the motorcycle described above, the storage box body is composed of two body halves divided bilaterally along the longitudinal direction thereof and made of synthetic resin material, and the hinge mechanisms for the storage box body and the lid members, the lock mechanism and the attachment bracket are disposed to span the two storage body halves to firmly join the same, thus improving the entire rigidity of the storage box body.

The individual molding of the two body halves makes it possible to mold the same having a relatively complicated shape with thin thickness, thus improving the workability and the productivity.

BRIEF DESCRIPTION OF THE DRAWINGS

For a better understanding of this invention and to show how the same is carried out, reference is now made, by way of the preferred embodiment, to the accompanying drawings, in which.

DESCRIPTION OF THE PREFERRED EMBODIMENT

Figure 1:
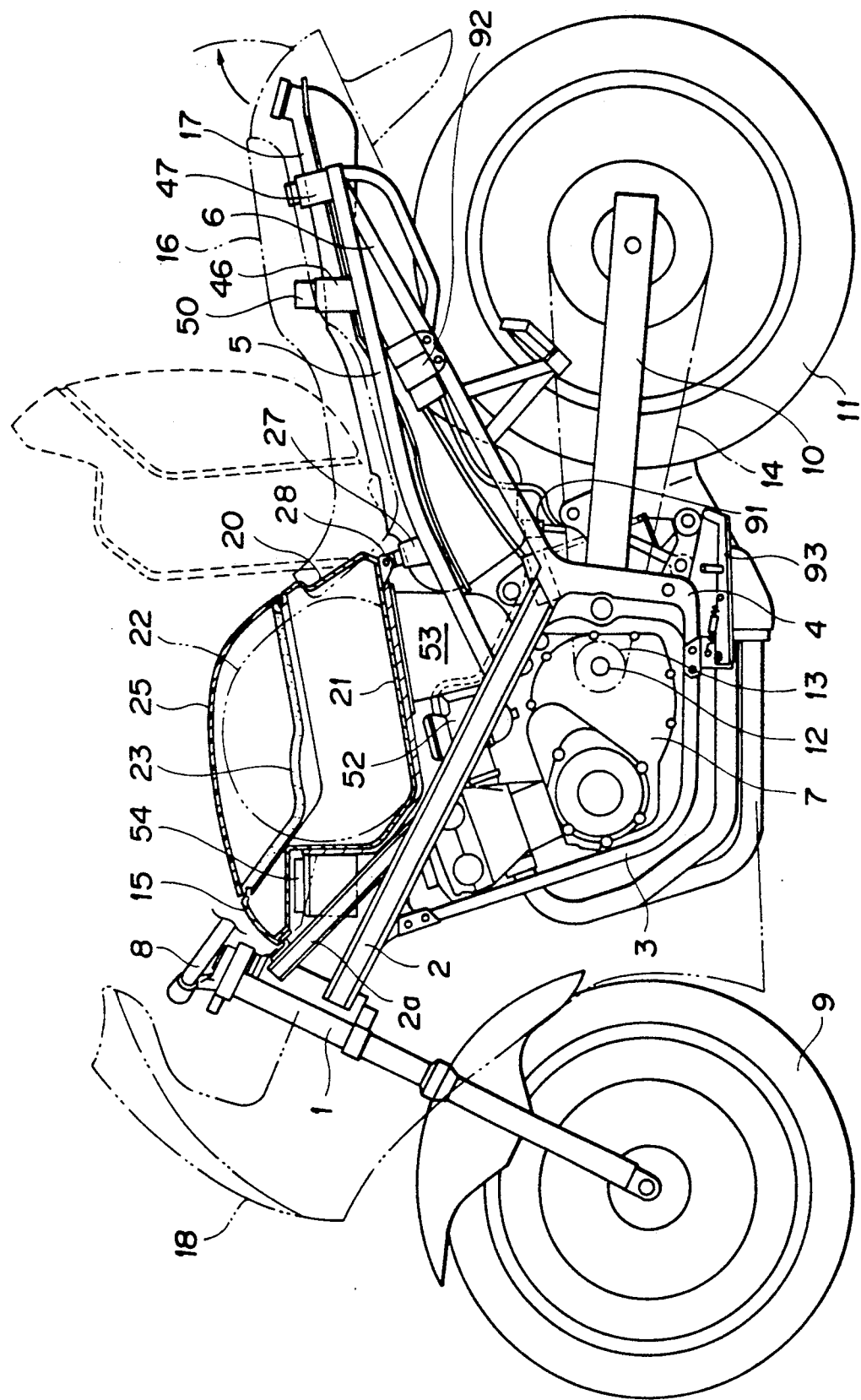
FIG. 1 is a side view, partially in section, of a motorcycle provided with a storage box apparatus according to this invention.
Figure 2:
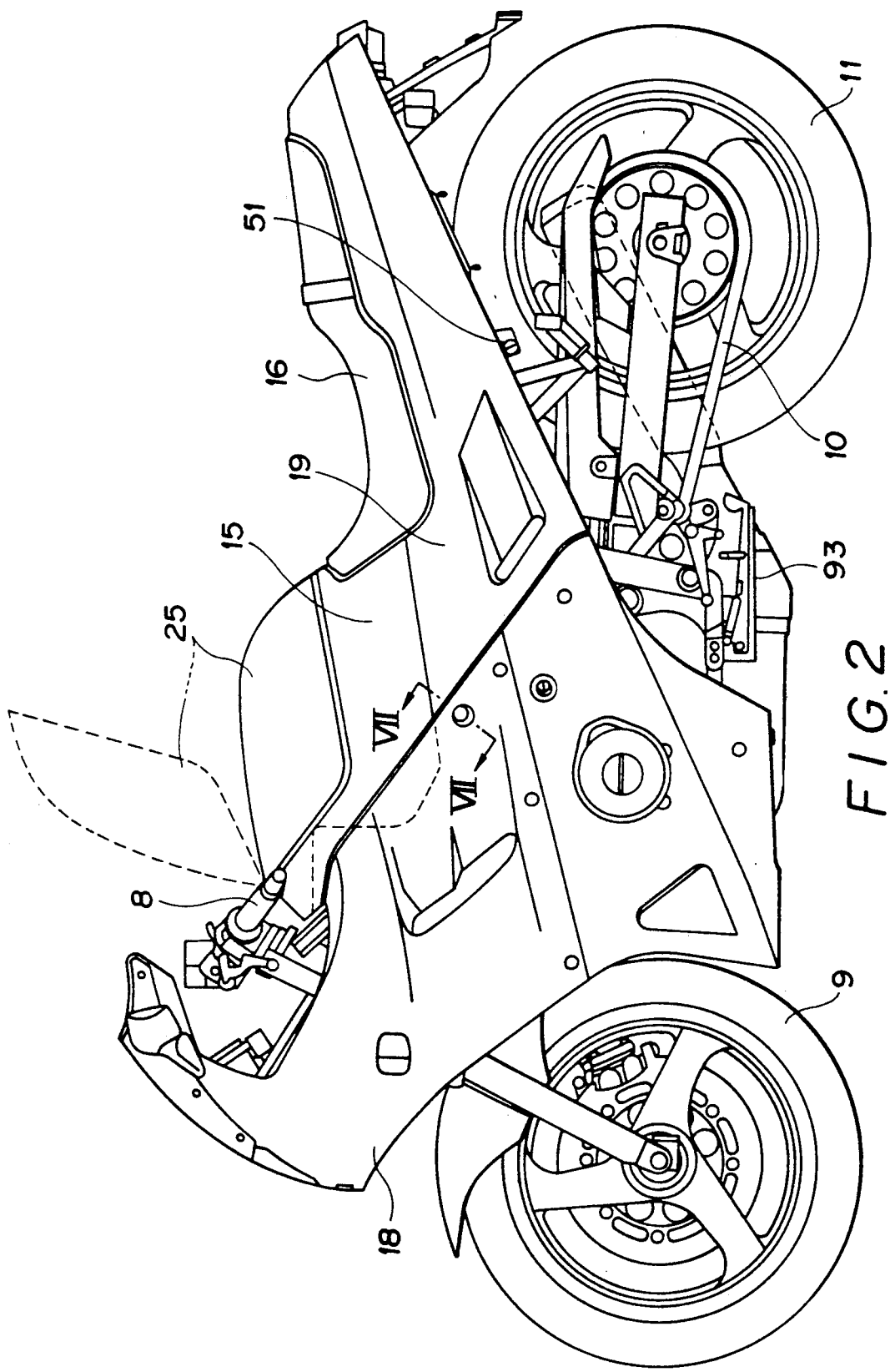
FIG. 2 is also a side view of a motorcycle of FIG. 1 showing an outer appearance thereof.
Figure 3:
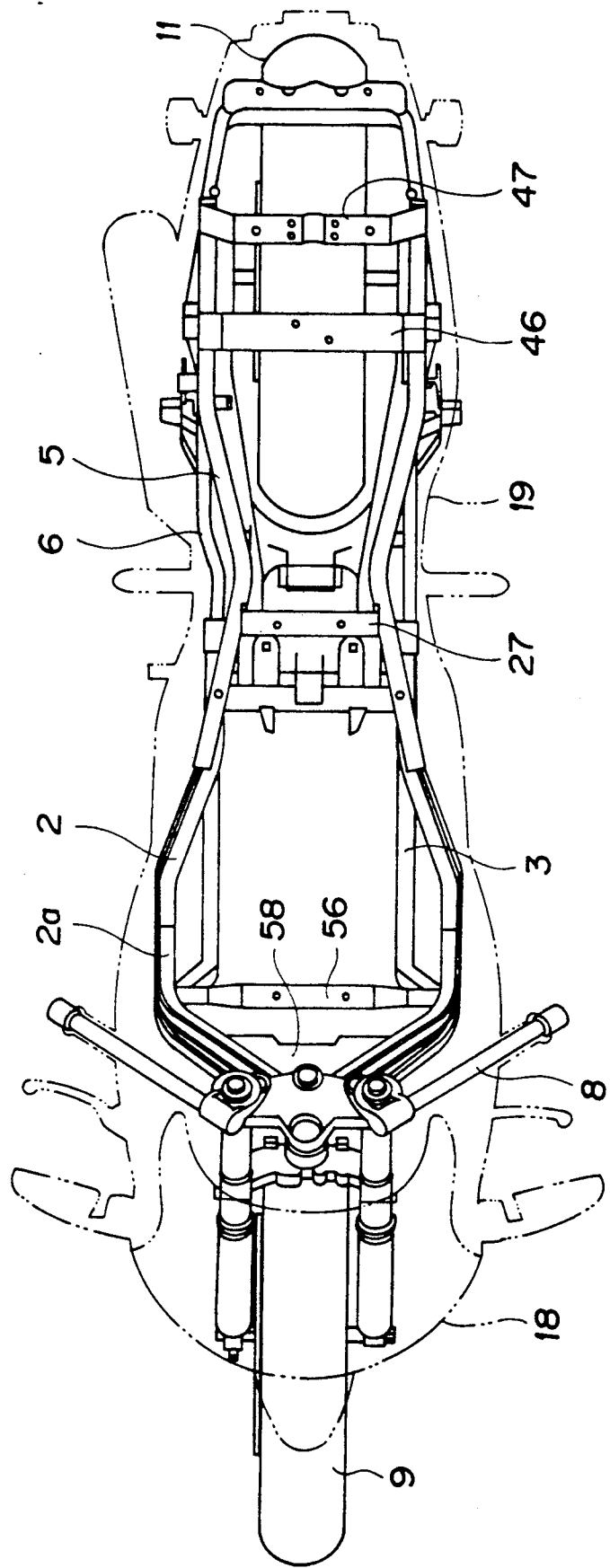
FIG. 3 is a top plan view showing a frame construction of the motorcycle shown in FIG. 1.

Referring to FIGS. 1 to 3, the frame assembly of the motorcycle is partly formed by a left and right pair of main tubes 2 which extend downwardly to the rear from a head pipe 1, left and right down tubes 3 which come down and then extended toward the rear, and left and right central pillars 4 which bind the rear ends of these tubes, and in addition, comprises left and right seat rails 5 which are connected to the rear end portion of the main tubes 2 and extend upwardly to the rear in an inclined manner, and a body tube 6 which is connected to the rear end of the main tubes 2 to support the rear end of the seat rails 5.

An engine unit 7 is suspended within the frame at substantially the central portion thereof. A front wheel 9 to be steered by a handle 8 is supported by means of a shaft at the head pipe 1, and a rear wheel 11 is supported at the rear end of a swing arm 10 which is pivotally supported by the central pillars 4. The rear wheel 11 is driven by way of a chain 14 from a drive sprocket gear 13 which is fixed to an output shaft 12 of the engine unit 7.

A storage box 15 is positioned above the main tubes 2 and the front portion of the seat rails 5, and a tandem-like seat 16 which may also serve as a pillion seat is placed rearward therefrom on the seat rails 5. Because of the positioning of the storage box 15, a fuel tank 17 is located within a space under the seat 16 surrounded by the seat rails 5 and by the body tube 6.

Both of the sides extending from the front of the engine unit 7 to the portion below the storage box 15 are covered by a cowling 18, and in continuation therefrom, the portion below the lower edge of the seat 16 and both the sides of the fuel tank 17 are covered by a body cover 19.

The main tubes 2 are connected to the lower portion of the head pipe 1, and upper main tubes 2a for reinforcement span from a position toward the center thereof to the upper portion of the head pipe 1. Both of these tubes 2 and 2a are led from the head pipe 1 to the rear and initially diverge outwardly from both sides, and, after passing the central portion of the main tubes 2, converge narrowly towards the front end portion of the seat rails 5.

Such convergence continues within a first quarter portion of the seat rails 5 or up to the front end portion of the seat 16, and a gradual widening occurs from that point on toward the center portion thereof, and they are extended to the rear substantially parallel to each other for the remaining half.

The storage box 15 has a substantially egg-like contour when seen from the top side, that is the storage box, becomes rounded at the front end and tapers off toward the rear so as to be compatible with the shape of the upper main tubes 2 and the seat rails 5, and, when seen from the side, the lower edge of the front half thereof extends along the upper main tubes 2a while a rear wall 20 is inclined downwardly to the rear so as to be in parallel thereto, resulting in a substantially parallelogram.

The storage box 15 has a bottom (bottom plate 21), contains a volume sufficient to accommodate a "full-face" helmet 22, and is provided with an opening 23 on the upper surface thereof through which the helmet 22 may be inserted and withdrawn. Attached to the opening 23 is a lid 25 of which the front end is capable of being opened and closed upwardly to the front by means of a hinge mechanism 24. The lid 25 may be also locked at its closed position by a lock mechanism 26.

The storage box 15 is fixed in the manner described hereunder with reference to FIGS. 4 to 8. In particular, a base plate 27 is placed to span the narrowest portion of the left and right seat rails 5. The lower surface at the rear end of the storage box 15 is pivotally supported on the base plate 27 via a hinge mechanism 28 so that it is swingable upwardly to the rear, and a front plate 30 which projects to the front and is attached a via cushion 29 to the front lower surface thereof is fastened with a bolt 31 to the front end of the upper main tube 2a.

Figure 6:
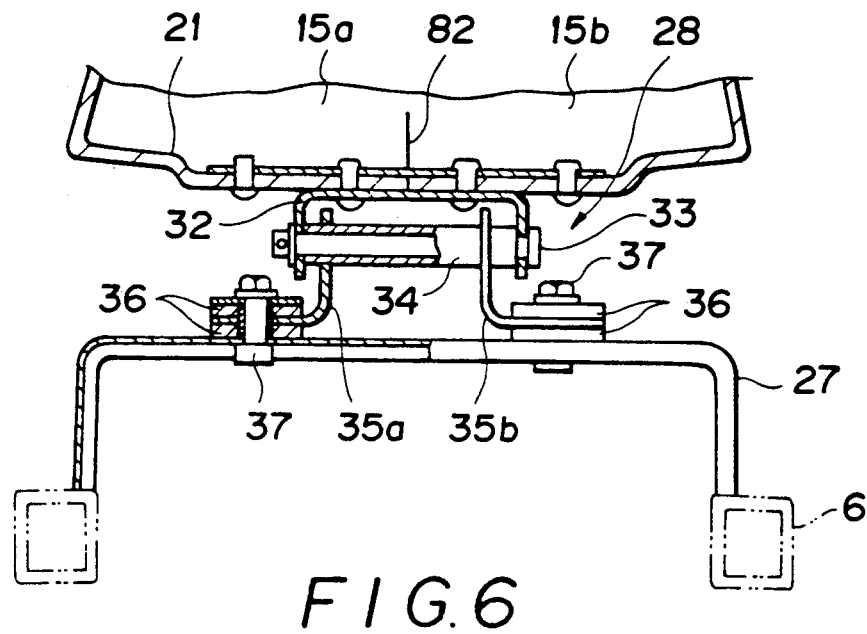
FIG. 6 is an enlarged sectional view taken along the line VI—VI shown in FIG. 4.

The hinge mechanism 28 as shown in FIG. 6 is constructed such that a bearing bracket 32 is riveted to the rear end lower surface of the bottom plate 21 of the storage box to hold a supporting shaft 33 in a shafting manner and, on the other hand, attaching brackets 35a, 35b respectively welded to both end portions of a pipe 34 are attached via cushions 36 onto the base plate 27 by means of bolts 37 so that the supporting shaft 33 and the pipe 34 are fitted into a shafting combination.

Figure 8:
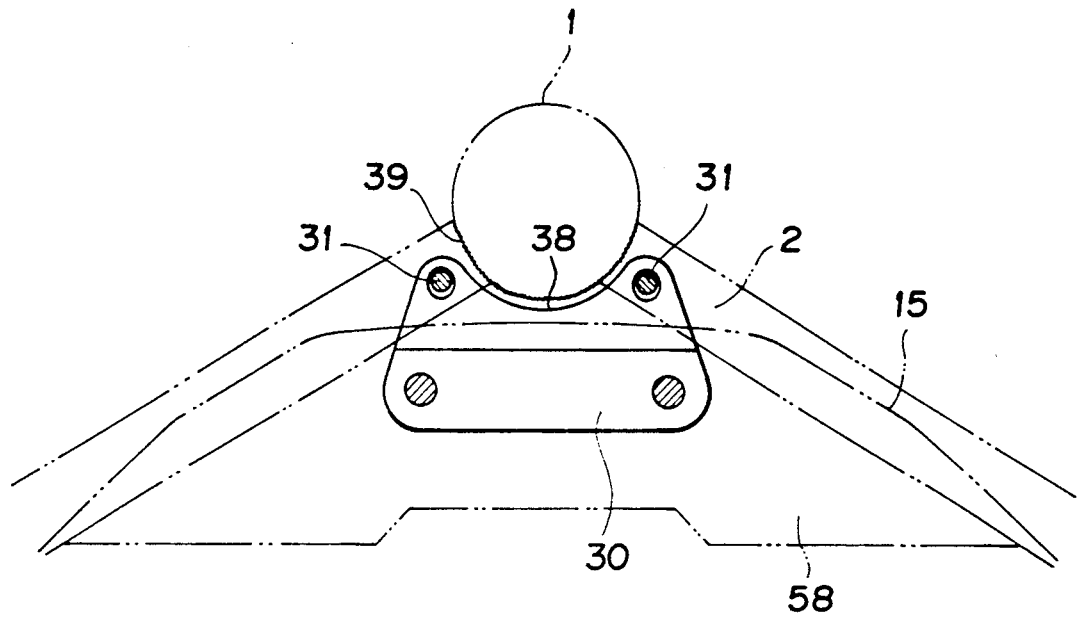
FIG. 8 is an enlarged view of a portion viewed from the arrow VIII shown in FIG. 4.

The front plate 30 as shown in FIG. 8 is formed with a semicircular notch 38 at the front edge thereof to constitute a surface parallel to the upper surface of the upper main tubes 2a, and is designed such that, at its attached position, it comes close to the connecting portion between the head pipe 1 and the upper main tubes 2a so as to encircle the back surface of the pipe 1 by the notch 38. The line of welding bead 39 at the connecting portion between the head pipe 1 and the upper main tubes 2a is thus concealed.

Figure 7:
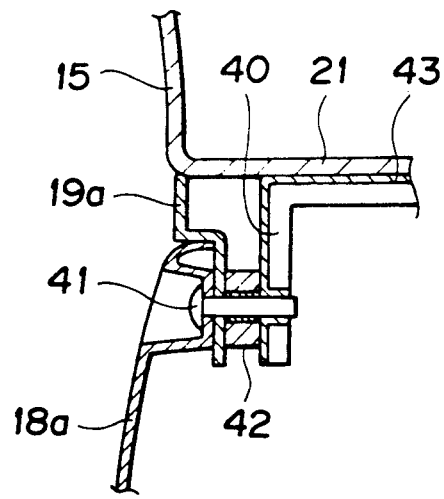
FIG. 7 is an enlarged sectional view taken along the line VII—VII shown in FIG. 2.

A downwardly projecting side attaching bracket 40 is provided at both the sides of the central portion of the storage box 15, and as shown in FIG. 7, is coupled by an ornamental pin 41 via a cushion 42 to connecting edge portions 18a, 19a at which the cowling 18 and the body cover 19 overlap each other. The left and right of the side attaching bracket 40 continue to each other through a base 43. The base 43 is extended along the lower surface of the bottom plate 21 and is fixed thereto by means of rivets 45 together with a backing strip 44 on the upper surface thereof.

Figure 4:
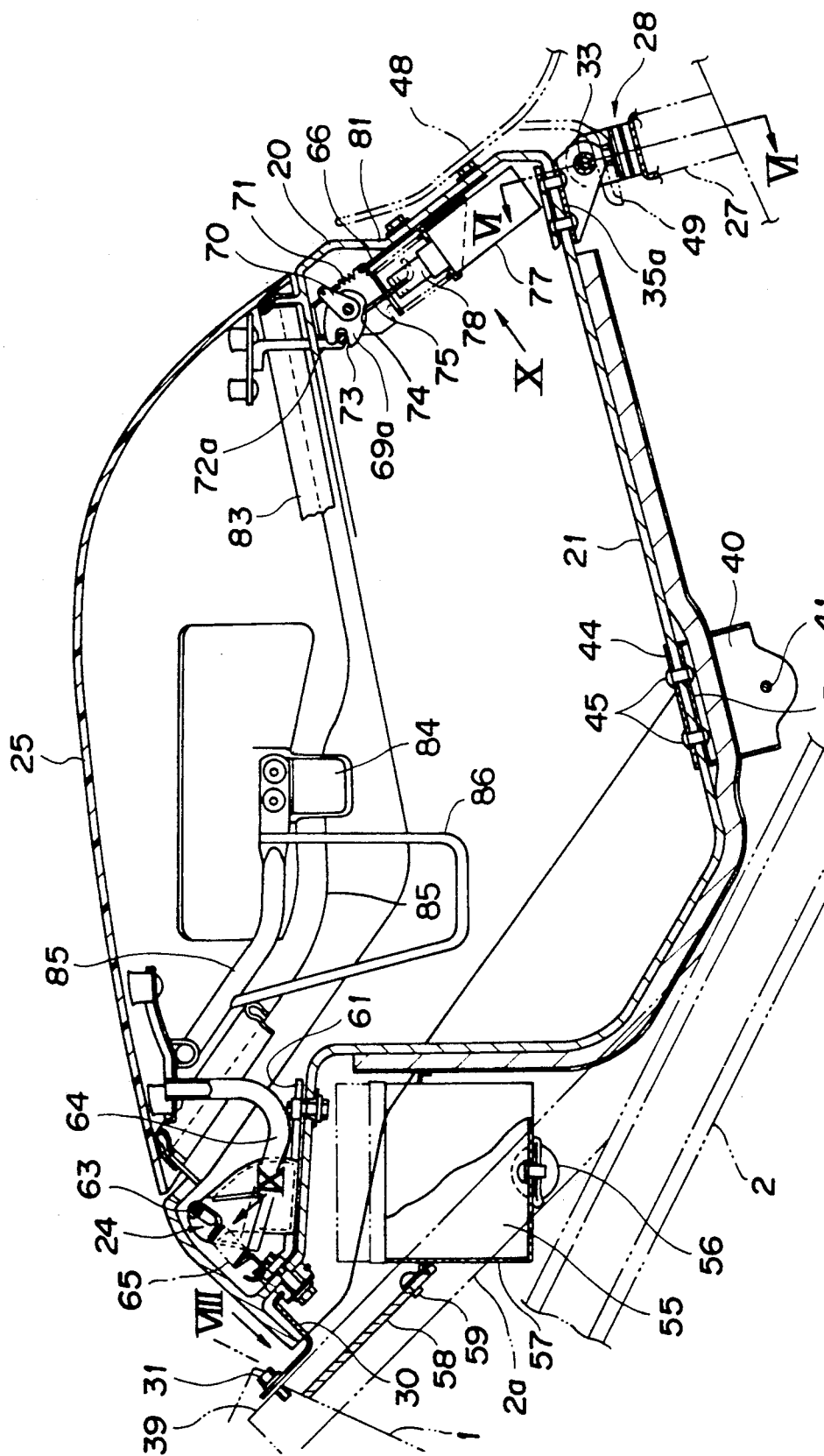
FIG. 4 is a longitudinal sectional view, in an enlarged scale, of the storage box apparatus of FIG. 1.
Figure 5:
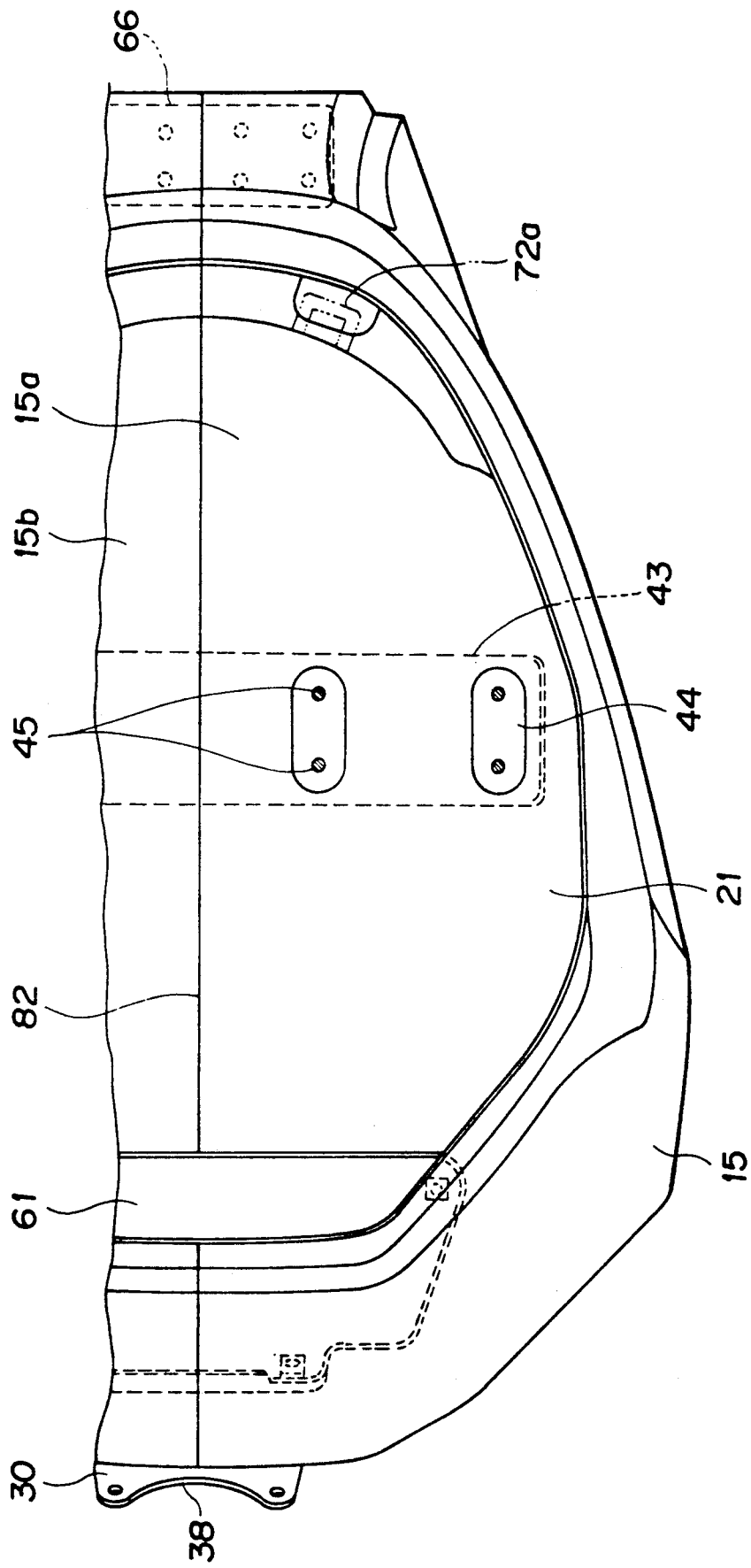
FIG. 5 is a plan view, partially broken away, of the storage box apparatus with a lid being removed.

On the other hand, provided at the rear portion of the seat rails 5, spanning the left and right thereof, are seat plates 46, 47 on which the seat 16 is placed. In this case, as shown in FIG. 4, a seat bottom plate front end portion 48 is provided with an inclination upwardly to the front so that it may come close to the rear wall 20 of the storage box 15 to thereby cause an overlapping.

The seat 16 is fixed by a conventional mechanism with which a seat lock 50 provided on the seat plate 46 is caused to work when an inserting bracket 49 projecting frontward from the front end portion 48 of the seat bottom plate is inserted from the rear into an inserting hole of the base plate 27. In this fixed state, swinging of the storage box 15 is prevented by the front end portion 48 of the seat bottom plate. A seat lock 50 may be unlocked by an a cylinder lock 51 and a key thereto which is located at the lower edge portion of the body cover 19.

By unlocking the seat lock 50 to remove the seat 16 and then by removing the front plate 30 and the side attaching bracket 40, the storage box 15 may be swung upwardly to the rear by means of the hinge mechanism 28. Such swinging angle is close to 90° or more, where the positional relationships thereof are set such that the storage box 15 is moved to the backside as seen from the shaft axis of the supporting shaft 33 of the hinge mechanism 28 so that it can stand upright on the upper surface of the fuel tank 17, as shown in dashed lines in FIG. 1.

In this way, by swinging the storage box 15 upwardly to the rear, the space above the engine unit 7 is cleared, making easier the maintenance and inspection of the portions of engine and auxiliaries thereto. For example, maintenance works such as adjusting of a carburetor 52, filter change for an air cleaner 53 and supplying of battery electrolyte for a battery 54 located nearby will be made easier.

A concave chamber 55 concaved in a substantially vertical manner is formed at the front end portion of the bottom plate 21 of the storage box 15. The battery 54 is held by a battery holder 57 located on a flat bridge tube 56 which spans the front edge portion of the upper main tubes 2a and is accommodated in the concave chamber 55 without any interference.

A triangular reinforcing plate 58 is welded between the front end of the upper main tubes 2a and the head pipe 1. The battery holder 57 has a portion fastened by a bolt 59 to the upper surface of the reinforcing plate 58.

Figure 9:
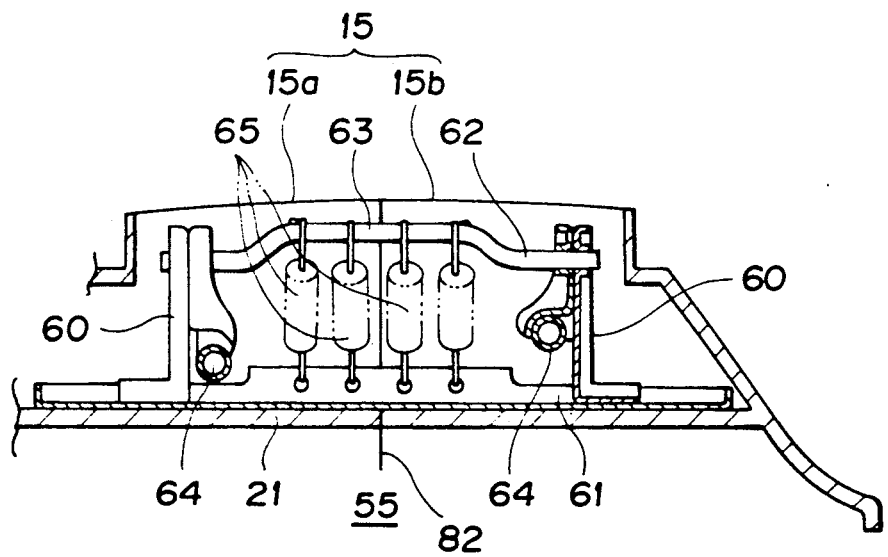
FIG. 9 is an enlarged rear view of a portion viewed from the arrow IX shown in FIG. 4.

As shown in FIG. 9, the hinge mechanism 24 of the lid 25 supports the supporting shaft 62 of the lid 25 in a pivotal manner, where a base plate 61 having bearings 60 raised on both sides thereof is attached to the front end portion of the bottom plate 21, i.e., to the upper wall of the concave chamber 55. The supporting shaft 62, formed with a crank-like eccentric portion 63, is fixed to the front end of left and right swinging levers 64 which are extended frontward from the front end of the lid 25. A plurality of coil springs 65 are loaded in parallel between the eccentric portion 63 of the supporting shaft 62 and the base plate 61.

The relationship between the force of the coil springs 65 and the eccentric portion 63 is set for the most part to produce a force in the direction to open the lid 25 and within the range where the degree of such openness is small to cause to reverse it to the closing direction beyond the dead point.

In this way, the hinge mechanism 24 is formed into a compact entity and acts effectively upon the opening and closing operation of the lid 25. In addition, the hinge mechanism 24 is of a small size, so that it does not consume space from the effective volume of the storage box 15.

Figure 10:
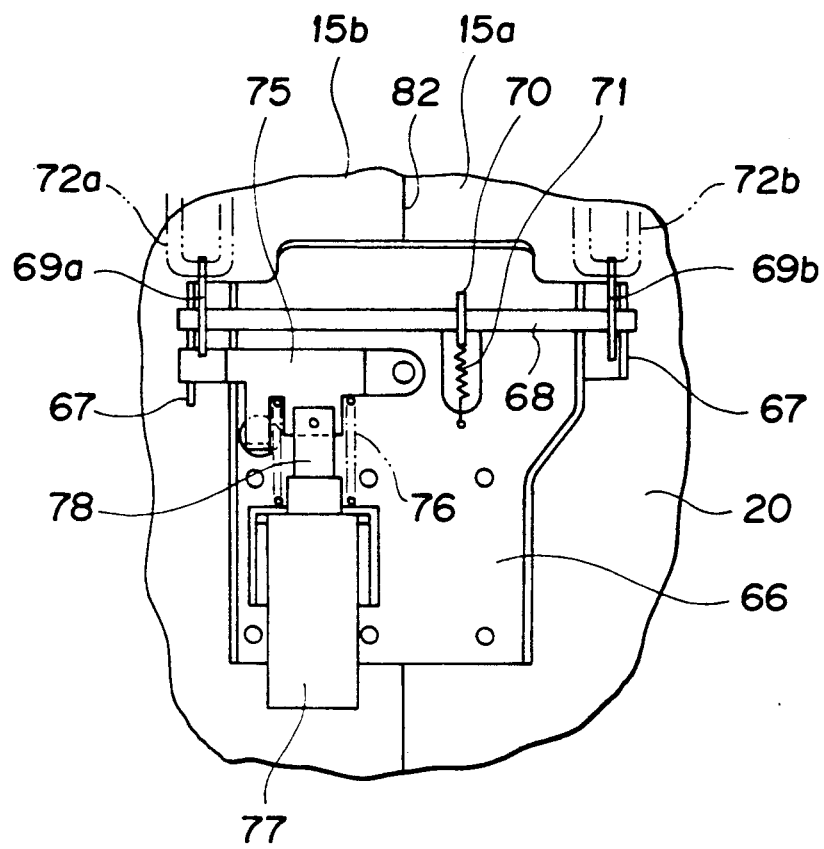
FIG. 10 is an enlarged front view of a portion viewed from the arrow X in FIG. 4.

On the other hand, as shown in FIG. 10, the lock mechanism 26 of the lid 25 is attached to the inner surface along the rear wall 20 of the storage box 15 by means of a base plate 66.

Bearings 67 extend from the left and right of the upper portion of the base plate 66, whereby a striker shaft 68 is pivotally supported. Fixed to the striker shaft 68 at the both ends thereof are left and right strikers 69a, 69b, and a lever 70 is also fixed thereto, suspending a spring 71 at the interval to the base plate 66 so that the strikers 69a, 69b are at all times urged to the releasing direction.

A left and right pair of hooks 72a, 72b extend from the rear end portion of the lid 25 so that, when the lid 25 covers the opening 23 of the storage box 15, the distal ends thereof engage with radial grooves 73 to pivot the strikers 69a, 69b in the locking direction.

One of the strikers 69a is formed with a cam face thereon having a stepped portion 74 at the outer periphery thereof, and an engaging lever 75 is resiliently urged into contact with the outer periphery by means of a spring 76 as shown in FIGS. 4 and 10. As described, when the strikers 69a, 69b are pivoted in the locking direction, the engaging lever 75 engages with the stepped portion 74 to prevent reverse rotation in the unlocking direction, whereby the hooks 72a, 72b cannot escape. In other words, the lock mechanism 26 is engaged to releasably lock the lid 25 in its closed position.

An engaging lever 75 is coupled in a linkage to a movable magnetic core 78 of a solenoid mechanism 77. Upon electric energization of the solenoid mechanism 77, the movable magnetic core 78 pulls the engaging lever 75 against the spring 76, whereby the strikers 69a, 69b are freed to unlock the lock mechanism 26.

In case the solenoid mechanism 77 cannot be actuated because of a failure in the electrical system, a through bore 81 is provided on the rear wall 20 which is located at the rear side thereof. By inserting a screwdriver or the like from the through bore 81 to push down the movable magnetic core 78, the lock mechanism 26 may manually be unlocked.

As described above, the through bore 81 is covered over along the outer surface thereof and thus concealed by the front end portion of the seat 16 in the seat lock position. Thus, persons other than those who can unlock the seat lock 45 cannot easily render a manual unlocking.

In this way, the lock mechanism of the lid 25 is compactly arranged and, similarly as the hinge mechanism 24, may be held within the storage box 15 in a space-saving manner. Since the hooks 72a, 72b are provided in a pair to the left and right in addition to the strikers 69a, 69b, the attached posture of the lid 25 is hardly collapsible. It is thus possible to reduce the thickness of the lid 25. Further, since the mechanism is placed along the rear wall 20 of the storage box 15, it may be provided with a secure manual unlocking system.

As shown in FIGS. 5, 6, 9, and 10, the storage box 15 is made by forming a synthetic resin into two box-like halves 15a, 15b that are longitudinally divided into left and right and by then attaching them together along a cementing line 82. Such cementing may be rendered by a light welding or gluing with adhesives to the extent that the sealing property is secured.

Furthermore, screwed or riveted to both box-like halves 15a, 15b in a spanning manner are: a bearing bracket 32 of the hinge mechanism 28; a front plate 30; the base plate 43 of the side attaching bracket 40; the base plate 61 of the hinge mechanism 24 for the opening and closing of the lid 25; and the base plate 66 of the lock mechanism 26.

These members serve as reinforcing members and increase the rigidity of the storage box 15. Since, furthermore, the two halves 15a, 15b, each having a bowl-like configuration, may be formed using a small number of molds and be accurately reduced in thickness, and also because simplification is possible in the cementing working, the storage box 15 may be produced efficiently and at low cost.

Further, the lid 25 is provided with a mechanism for preventing the deformation thereof. The lid 25 is so mounted that the inner surface of the peripheral edge portion thereof is brought into contact with a seal 83 provided in the opening 23 of the storage box 15. Tongue pieces 84 integrally protruded from the material of the lid 25 and hand down at the opposite side portions of the inner surface of the lid 25 so as to leave the inner surface, and tubular reinforcement ribs 86 hang down from the pipe 85 and are fixedly secured to the inner peripheral surface so as to leave the inner surface. These tongue pieces 84 and reinforcement ribs 86 are introduced into the inside of the aforementioned seal 83 when the lid 25 is closed, whereby the peripheral edge of the opening 23 takes such a condition as being held between the inside and outside portions so as to prevent the deformation. Especially, such deformation prevention construction is effective for such a theft as taking out a stored commodity by forcedly spreading the opposite side portions of the peripheral edge of the lid 25.

As has been described, the motorcycle is provided with a storage box apparatus with an opening-closing lid having one end pivotally supported on the frame by a hinge mechanism in a manner upwardly swingable and the other end fixed to the frame by an attaching bracket. The storage box is made by welding or gluing synthetic resin box-like halves that are divided into left and right. The hinge mechanism and attaching bracket that are placed on the outer surface thereof and the hinge mechanism of the lid and lock mechanism that are placed on the inner surface, are fixed thereto spanning the two box-like halves. Accordingly, the storage box is highly rigid and robust may be obtained with high efficiency and at low cost by cementing the left and right box-like halves to the extent that they are sealed.

What is claimed is:

1. A storage box apparatus of a motorcycle disposed at substantially an upper central portion of a body frame of the motorcycle, comprising:

a storage box body having an upper opening and comprised of two box halves which are joined with each other to form the storage box body, said storage box body being swingably attached at one end to the body frame and secured at another end to the body frame through an attachment bracket;

a lid member for opening and closing the opening of the storage box body and being mounted to be upwardly swingable;

first attaching means disposed at an outer surface of said storage box body for supporting said storage box body to be movable relative to the body frame;

second attaching means disposed at an inner surface of said storage box body for supporting said lid member so as to open and close said storage box body; and lock means disposed at an inner surface of said storage box body for releasably locking said lid member;

said first and second attaching means, said lock means and said attachment bracket being arranged to span said two box halves.

2. A storage box apparatus according to claim 1, wherein said two box halves are made of synthetic resin material.

3. A storage box apparatus according to claim 2, wherein said two box halves are welded into a unitary storage box body.

4. A storage box apparatus according to claim 2, wherein said two box halves are bonded into a unitary storage box body.

5. A storage box apparatus according to claim 1, wherein said first attaching means comprises first hinge means for swingably supporting said storage box body to be upwardly swingable, and said second attaching means comprises second hinge means for swingably supporting said lid member to be upwardly swingable.

6. A storage box apparatus according to claim 5, wherein said storage box body includes a bottom plate, and wherein said first hinge means is disposed at one end of said storage box body and includes a bearing bracket through which said first hinge means is swingably secured to said bottom plate.

7. A storage box apparatus according to claim 6, wherein said first hinge means is disposed at a rear end portion of said storage box body.

8. A storage box apparatus according to claim 6, wherein said second hinge means is disposed at another end of said storage box body and includes bearing means through which said second hinge means is swingably secured to said bottom plate.

9. A storage box apparatus according to claim 8, wherein said second hinge means is disposed at a front end portion of said storage box body.

10. A storage box apparatus according to claim 1, wherein said lock means is attached to a rear end portion of said storage box body on an outside of said lid member and includes a striker, an engaging lever operatively connected to the striker and solenoid means operatively connected to said engaging lever.

11. A storage box apparatus according to claim 1, further comprising bracket means downwardly extending from an outer surface of said storage box body at substantially a central portion of a bottom portion of said storage box body, said bracket means being secured to the body frame.

12. A storage box apparatus according to claim 1, wherein said storage box body has a front portion which is recessed inwardly to form a space between the storage box body and the body frame.

* * * * *